United States Patent
Yamakawa et al.

(10) Patent No.: US 6,987,571 B2
(45) Date of Patent: Jan. 17, 2006

(54) SENSOR HEAD, LUMINANCE DISTRIBUTION MEASUREMENT APPARATUS HAVING THE SENSOR HEAD, AND UNEVENNESS INSPECTION/EVALUATION APPARATUS

(75) Inventors: Noboru Yamakawa, Yatusiro (JP); Toshihiro Taguchi, Yatusiro (JP)

(73) Assignees: Japan Science and Technology Corporation, Saitama-Ken (JP); Kumamoto Technopolis Foundation, Kumamoto-Ken (JP)

(*) Notice: Subject to any disclaimer, the term of this patent is extended or adjusted under 35 U.S.C. 154(b) by 788 days.

(21) Appl. No.: 09/818,450

(22) Filed: Mar. 27, 2001

(65) Prior Publication Data

US 2002/0018249 A1 Feb. 14, 2002

(30) Foreign Application Priority Data

Mar. 28, 2000 (JP) ........................ 2000-089829

(51) Int. Cl.
- G01B 11/30 (2006.01)
- G01N 21/55 (2006.01)
- H01L 27/00 (2006.01)
- H01L 40/14 (2006.01)

(52) U.S. Cl. .................... 356/600; 356/445; 250/208.1; 250/214 R

(58) Field of Classification Search ................ 356/600, 356/445, 121–122, 446; 250/208.1, 214 R
See application file for complete search history.

(56) References Cited

U.S. PATENT DOCUMENTS

| 4,583,858 A | * | 4/1986 | Lebling et al. ............. 356/402 |
| 4,583,861 A | * | 4/1986 | Yamaji et al. ............. 356/446 |

FOREIGN PATENT DOCUMENTS

| JP | 62-242833 | 10/1987 |
| JP | 1-148834 | 1/1988 |
| JP | 04-288638 | 10/1992 |
| JP | 06-094515 | 4/1994 |
| JP | 07-035645 | 2/1995 |
| JP | 07-294328 | 11/1995 |
| JP | 08-220014 | 8/1996 |

* cited by examiner

Primary Examiner—Gregory J. Toastley, Jr.
Assistant Examiner—Amanda Merlino
(74) Attorney, Agent, or Firm—McGlew and Tuttle, P.C.

(57) ABSTRACT

A sensor head has a multiplicity of linear image sensors in correspondence with different radial directions of light emitted from a pixel in a pixel line of an LCD panel. The linear image sensors extends in the direction of the axis of an imaginary semi-cylinder. The linear image sensors have light receiving faces that are angularly spaced apart on an imaginary semi-cylinder, with their light receiving faces having normals passing through the axis of the imaginary semi-cylinder. Interposed in the space between the LCD pixel and the linear image sensors is an optical system having a multiplicity of light paths associated with respective angular components of the radiation emitted from the pixel line. Each of the light paths receives a predetermined angular component of light and transmits the light thus reveived to a corresponding one of the linear image sensors.

6 Claims, 9 Drawing Sheets

SENSOR HEAD, LUMINANCE DISTRIBUTION MEASUREMENT APPARATUS HAVING THE SENSOR HEAD, AND UNEVENNESS INSPECTION/ EVALUATION APPARATUS

FIELD OF THE INVENTION

The invention relates to a sensor head for detecting an angular distribution of the intensity or luminance of light radiated from a self-luminescent object such as lamps, light emitting diode (LED) displays, electro-luminescence (EL) displays, plasma display panels (PDP), and liquid crystal display (LCD) panels illuminated from behind for selective transmission of light to display an image. The invention also relates to an apparatus equipped with such sensor head for measuring the luminance distribution of such luminary object as mentioned above. The invention further relates to an apparatus which utilizes such sensor head to analyze unevenness in luminance of an image to be displayed (hereinafter referred to simply as unevenness).

BACKGROUND OF THE INVENTION

In recent years, there have been developed apparatuses for inspecting unevenness in angular distribution of luminance of LCD display panels for example, utilizing a linear image sensor having charge coupled devices (the apparatus hereinafter referred to as CCD linear image sensor), as disclosed in Japanese Patent Early Publication 8-220014.

FIG. 7 shows a conventional luminance distribution measurement apparatus, which includes a linear image sensor 2L, LCD pixels 3, lines of pixels 3L, an LCD panel 4, a table 5 for moving the LCD panel 4 in x-direction, a light source 6, inspection data input device 7a, a LCD driver 8, a table drive control device 9, a light source control device 10, a display device 11 for displaying measurement data and results of the inspection, a data processing unit 12a, and a control unit 12b.

In measuring the luminance of a LCD panel, the panel is illuminated by the light source 6. The CCD image sensors each receive light from corresponding pixels, transform it into an electric signal, and send it to the inspection data input device 7a.

After the measurements of luminance distribution for one line of pixels, the table 5 is moved in the x-direction by the table drive control device 9 so that the linear image sensor 2L performs measurement of luminance of the pixels in the next line 3L. The inspection data input device 7a sends the measurement data to the data processing unit 12a, which stores, processes, inspects the data and displays the result of the inspection on the display device 11.

Generally, LCD panels have a characteristic that the luminance varies with viewing angle. The above mentioned known luminance measurement apparatus have drawbacks in that they fail to measure this luminance characteristic precisely. That is, in the inspection and/or analysis of an LCD panel, it simply measures the luminance in a predetermined direction, particularly in the direction normal to the panel.

The direction of the line of sight for a measurement apparatus looking at a pixel 3 on an LCD panel, or the direction of the beam of light radiated from the pixel 3, is represented by a polar coordinate $(\theta, \phi)$, where $\theta$ is the vertical angle (hereinafter referred to as angle of incidence) between the normal axis passing through the pixel 3 and the line of sight, and $\phi$ is the azimuth angle with respect to a referential axis (referred to as x-axis) in the plane of the panel, as shown in FIG. 8. Thus, the angle of incidence $\theta$ is $0°$ for the line of sight normal to the LCD panel, while the angle of incidence is $90°$ for the line of sight parallel to the LCD panel. For the radiation emitted from the pixel 3, $\theta$ and $\phi$ are in the range $0 \leq \theta \leq 90°$ and $0 \leq \phi \leq 180°$. In order to carry out inspection of the LCD panel, it is necessary to measure luminance over the entire angular domain.

However, a conventional sensor head (e.g. a image sensing device 2, a CCD camera) suffers from measurement errors made by the image sensors at the opposite ends of the device looking at the pixel at large angles $\theta$, as shown in FIG. 9A. The errors will become larger when the LCD panel is moved for further measurement since the angle $\phi$ then increases.

The range of the angle of incidence $\theta$ that can be covered by the image sensor 2 could be extended by a lens 14 as shown in FIG. 9B. Since such lens has only a limited dimension, it still suffers similar errors at large angle of incidence $\theta$ and therefore the image sensor 2 would have a limited range for precise measurement of the luminance.

In order to precisely measure the luminance distribution for a given pixel up to about $90°$ in the angle of incidence $\theta$, it is necessary to position the image sensor 2 at a large distance away from the pixel 3 as shown in FIG. 9C, and move the image sensor 2 perpendicularly to the radiation from the pixel 3.

In order to perform the measurement in a manner as described above and depicted in FIG. 9C, it is necessary to move the image sensor 2 along a circular orbit about the pixel after the image sensor 2 is positioned and fixed at a prescribed position relative to the pixel under measurement and then move the LCD panel in the x-direction, which requires a relatively complex mechanism for moving the image sensor 2 and the LCD panel, requiring much measurement time and a costly sophisticated machine.

SUMMARY OF THE INVENTION

It is therefore an object of the invention to provide a sensor head capable of precisely and quickly inspecting the luminance distribution of radiation coming from LCD pixels over an entire vertical angle (or angle of incidence) $0 \leq \theta \leq 90°$ and entire azimuth angle $0° \leq \phi \leq 180°$.

It is another object of the invention to provide an apparatus for measuring the luminance distribution of radiation equipped with the sensor head as mentioned above.

It is a further object of the invention to provide an apparatus for inspecting/evaluating unevenness in the angular distribution of radiation equipped such sensor head as mentioned above.

It is a still further object of the invention to provide a compact sensor head, which enables provision of a compact luminance distribution measurement apparatus equipped with such compact sensor head.

To the accomplishment of the foregoing objects, a sensor head of the invention includes:

a multiplicity of linear image sensors arranged in parallel with a given line of pixels and arranged on an imaginary semi-cylindrical surface having the axis thereof coincided with the line of pixels, the linear image sensors adapted to receive light emitted from the line of pixels at different vertical angles and transform it into electric signals indicative of the luminance of the line of pixels at vertical angle $\theta$ in the range $-90° \leq \theta \leq +90°$.

A sensor head of the invention may include an optical system for receiving light emitted from a line of pixels at different vertical angles and for transmitting the light received to a light sensing means which transforms the light into electric signals indicative of the luminance of the line of pixel at vertical angle θ in the range −90°≦θ≦+90°. A sensor head of the invention as defined in claim 3 comprises an optical system for receiving light emitted from a light source at the center of an imaginary sphere and for transmitting the light received to a light sensing means which transforms the light into electric signals indicative of angular distribution of luminance of the light source.

Luminance distribution measurement apparatuses of the invention may be equipped with the sensor heads adapted to measure easily and quickly the luminance distribution of the entire pixels by aligning the axis of the imaginary semi-cylinder or the center of the imaginary sphere associated with the sensor heads while moving the sensor heads relative to the pixels under measurement.

An apparatuses for inspecting/evaluating unevenness of luminance appearing on a display (hereinafter referred to as unevenness inspection/evaluation apparatus) may be arranged to detect and analyzes the unevenness in luminance and evaluate it based on the luminance information stored in the memories of the luminance distribution measurement apparatuses.

DESCRIPTION OF THE PREFERRED EMBODIMENT

Figure 1A:
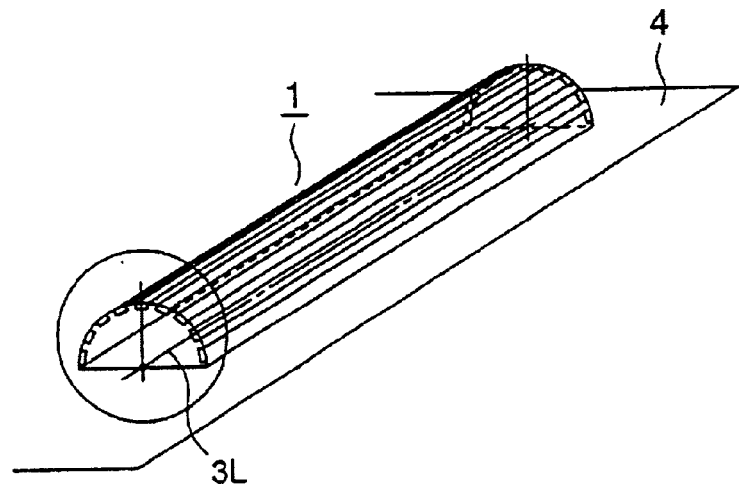
FIG. 1A is a perspective view of a sensor head having a multiplicity of linear image sensors according to the invention.

The invention will now be described by way of example with reference to FIGS. 1A through 7, wherein like reference numerals represent like or corresponding parts throughout the drawings.

EXAMPLE 1

Figure 1B:
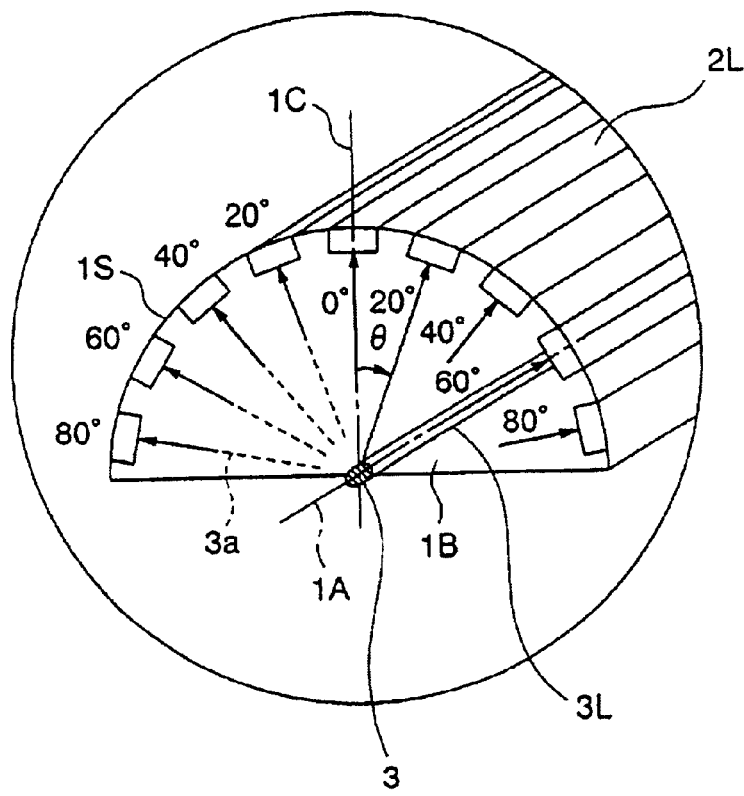
FIG. 1B shows an enlarged end view of the sensor head of FIG. 1A.

Referring now to FIGS. 1A and 1B, there is shown a sensor head having a multiplicity of linear image sensors according to the invention. Indicated generally by a reference numeral 2L in FIG. 2 are a multiplicity of linear image sensors. The area occupied by the pixels on the LCDs is a few times to 10 times as large as the area occupied by the linear image sensors. Each of the linear image sensors 2L extends in the direction of the axis 1A of imaginary semi-cylindrical surface 1S, and angularly spaced apart on the inner surface of the imaginary semi-cylinder with their light receiving face oriented towards the axis 1A. Thus, the normal of each light receiving face of the linear image sensor 2L passes through the axis 1A of the imaginary semi-cylinder. A sensor head 1 incorporating the linear image sensors 2L shown in FIGS. 1A and 1B has its axis 1A coincided with the line of pixels.

As shown in FIGS. 1A and 1B, the linear image sensors 2L are angularly disposed on the imaginary semi-cylindrical surface 1S, symmetrically about the vertical C-axis at angles of incidence 0°, 20°, 40°, 60°, and 80° with respect thereto, where C-axis is taken along the normal vector perpendicular to the horizontal plane passing through the lower end 1B of the semi-cylinder and passing through the axis 1A.

When a pixel 3 in the pixel line 3L is activated to emit light, the multiple linear image sensors 2L are scanned in turn in synchronism with the activation so as to sample light radially propagating from the pixel 3 to the linear image sensors. In such scanning, the luminance is measured for the angle of incidence θ=0°, 20°, 40°, 60°, and 80° and for azimuth angle φ=φ and φ+180°. The luminance distribution can be measured for all the pixels in the pixel line 3L in the same manner. The accuracy of the luminance distribution curve thus obtained, and hence the accuracy of the measurement for the LCD panel, will be increased by increasing the number of the linear image sensors 2L and the number of viewing angles.

The luminance distribution of the entire pixel line is obtained by activating all the pixels in turn and scanning the light by the linear image sensors each time.

EXAMPLE 2

Figure 2A:
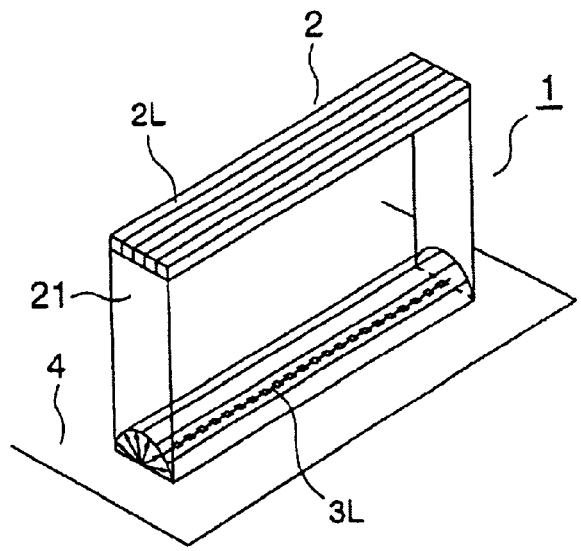
FIG. 2A is a perspective view of another sensor head having a multiplicity of linear image sensors and an optical system according to the invention.

Referring to FIG. 2A, there is shown another embodiment of a sensor head that utilizes the linear image sensors of FIG. 1. This sensor head 1 includes a linear sensor assembly 2 having a multiplicity of linear image sensors 2L arranged on a common plane, and an optical system 21. In the example shown herein, each of the linear image sensors 2L is arranged in parallel with a given pixel line 3L. The optical system 21 is designed to receive beams of light that propagate from the pixel line 3L at different radial directions (i.e. at different vertical angles or angles of incidence) and for transmitting each beam to a corresponding linear image sensor 2L intended for sensing the light emitted from the pixel line 3L at a particular angle. The optical system 21 consists of such elements as for example a lens, a prism, a mirror, and a set of optical fibers. In the example shown in FIG. 2A, the light receiving faces of the optical system are disposed on the surface of an imaginary semi-cylinder.

The optical system is adapted to receive light radiated from the pixel line (or linear area) 3L at different vertical angles and transmits the light to corresponding linear image sensors 2L. Measurement of the luminance distribution characteristic of the LCD panel in the plane perpendicular to the pixel line may be carried out in the same manner as in the example shown in FIGS. 1A and 1B.

Figure 3A:
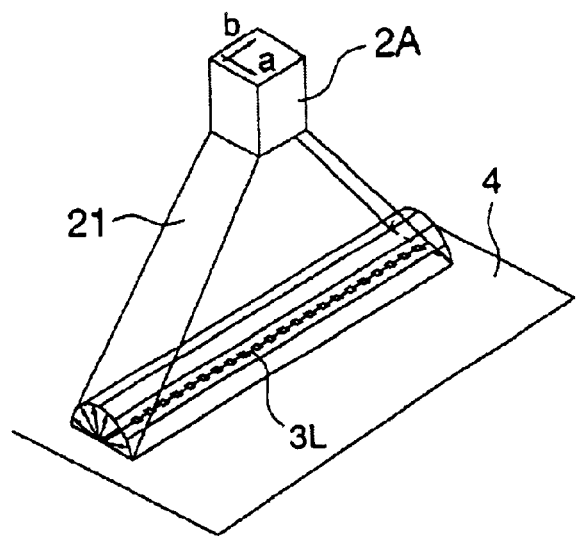
FIG. 3A shows a unitary area image sensor coupled with an optical system.

It is noted that the light paths can be established for radial distributed light emitted from an LCD pixel line, one for each angular direction of measurement by the image sensors (FIG. 3A). The arrangement of the light receiving elements of the optical system is not limited to a semi-cylindrical configuration, and may be arranged in any configuration so long as they are arranged to properly receive beams of light at all vertical angles.

Thus, the linear image sensors 2L can be arranged on the same plane as shown in FIG. 2A or not in the same plane. An optical system 21 in the form of a rod lens for example may be provided for the light paths (such as an element 3a shown in FIG. 1) between the linear image sensors 2L and the pixel lines 3L, for optically connecting each of the pixel in the pixel line 3L with a corresponding linear image sensor 2L in the vertical direction θ, as shown in FIG. 1A and in FIG. 2A. In this instance, each of the linear image sensors 2L can measure more accurately only the radiation which is directed to that linear image sensor 2L. Thus, if all the pixels of the LCD are activated, only a predetermined line of pixels can be measured by a particular linear sensors.

Figure 2B:
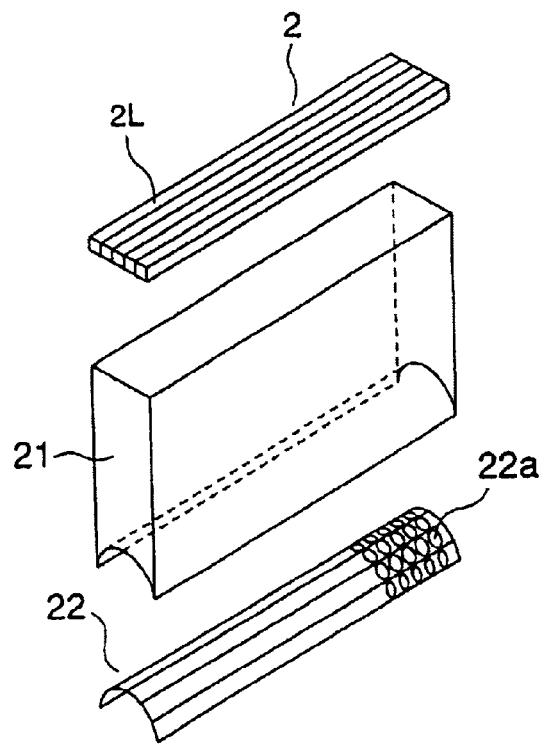
FIG. 2B is the sensor head of FIG. 2A having an additional incident light limiter 22.

FIG. 2B is an exploded view of a sensor head shown in FIG. 2A further including an incident light limiter 22. The incident light limiter 22 comprises a slit or a pin-hole 22a mounted on the light receiving faces of the optical system 21 to limit radial component of the incident light impinging on the light receiving faces. The incident light limiter 22 is not inevitable to the sensor head as shown in FIG. 2A, and can be omitted.

EXAMPLE 3

FIG. 3A shows an exemplary sensor head which utilizes a CCD area image sensor 2A instead of linear image sensors 2L shown in FIG. 3A. The optical system 21 is adapted to receive light radiated from a line of pixels and/or multiple lines of pixels 3L at different vertical angles and transmits the light to corresponding linear image sensors 2L. The light receiving faces can be distributed on an imaginary semi-cylinder for example. Each of the angular components of the radiated light is related to a corresponding sensing pixel of the area image sensor 2A by means of an optical element of the optical system 21, in the same manner as in the second example.

When the pixels in the pixel line 3L are activated, they emit beams of light at different vertical directions, which are picked up by the area image sensor 2A through the optical elements associated with the respective directions. In the example shown in FIG. 3A, the area image sensor 2A scans the sensing pixels in the area image sensor 2A in the direction of "a" as shown in the figure to detect respective beams. Then the next LCD pixel is activated in the pixel line 3L, and active sensing pixels of the area sensor 2A are shifted by 1 position in "b" direction to pick up incident light from the LCD pixel by scanning the sensing pixels in "a" direction. In this way, the viewing angle characteristic of the pixel line is measured for the LCD panel.

EXAMPLE 4

Figure 3B:
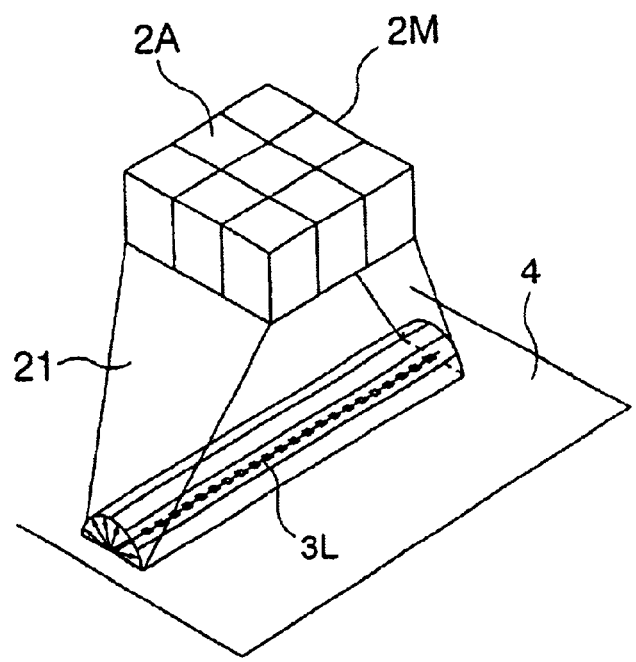
FIG. 3B shows a multiple area image sensors coupled with an optical system.

FIG. 3B shows an exemplary sensor head which utilizes a set 2M of area image sensors instead of a single area image sensor 2A of example 3 shown in FIG. 3B. In this arrangement the sensor head 2M has an improved resolution for luminance measurements. The area image sensors 2A in the set 2M can be arranged on the same plane or not on the same plane. The angular correspondence to be established between the light receiving faces of the optical system and the CCDs in the set of multiple area image sensors 2M is the same as in the third example above, and so is the manner in which viewing angle characteristic is measured.

EXAMPLE 5

Figure 4A:
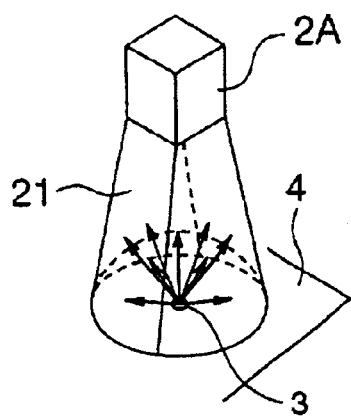
FIG. 4A is a perspective view of another sensor head having a unitary area image sensor coupled with an optical system.

FIG. 4A shows an exemplary sensor head that enables measurement of the spherical distribution of radiance for a pixel 3 at a given point. The sensor head as shown in FIG. 4A consists of one area image sensor 2A and an optical system 21. Each of the light receiving faces of the optical system is adapted to receive only a predetermined component of the beam of light from the pixel 3 to enter into the optical system. Each radial component of the light is uniquely related to a particular sensing pixel of the area image sensor 2A to establish one-to-one correspondence between them by means of an optical element, as in the third and the fourth examples above. The LCD pixel positioned at the center of the imaginary sphere is activate to emit light. By scanning the sensing pixels in the area image sensor 2A, and by permitting only prescribe radial components to enter the area image sensor 2A, intensities of various radial components of the radiation, and hence the overall viewing angle characteristic of the pixel, can be determined.

Figure 4B:
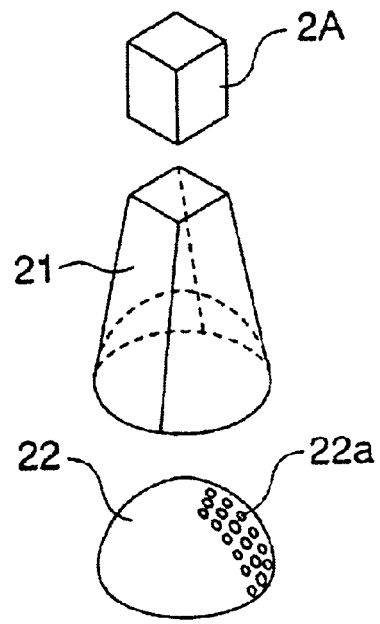
FIG. 4B is an exploded view another sensor head having a multiplicity of area image sensors coupled with an optical system.
Figure 4C:
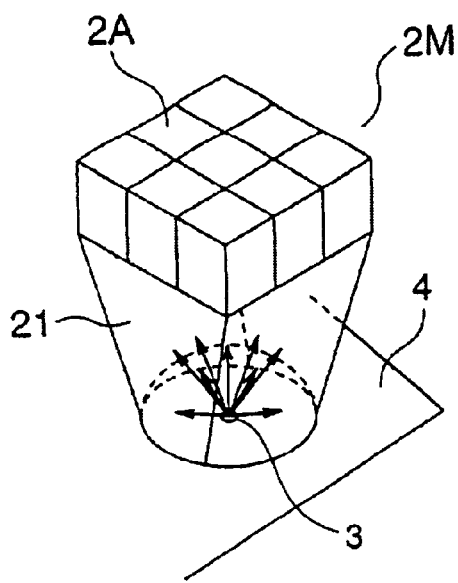
FIG. 4C is a perspective view of a multiple area image sensors coupled with an optical system.

FIG. 4B is an exploded perspective view of a sensor head which is the same as the sensor head of FIG. 4A except that it has an additional incident light limiter. The incident light limiter 22, in the form of a slit or a pin-hole 22a provided on the light receiving faces of the optical system 21, limits the amount of radial component of the incident light to pass therethrough. The incident light limiter 22 is not inevitable to the sensor head as shown in FIG. 4A, and can be omitted.

EXAMPLE 6

FIG. 4B shows a sensor head utilizing a set 2M of a multiplicity of area image sensors instead of a single area image sensor 2A of the fifth example (FIG. 4A). This sensor head will improve the resolution of a luminance measurement apparatus. The area image sensors 2A in the set 2M can be arranged on the same plane or not on the same plane. The correspondence to be established between the radial components of the radiated light and the area image sensors 2A of the optical system 21, and is the same as in the fifth example above. The method of measuring the luminance distribution is also the same as in the fifth example.

EXAMPLE 7

Figure 5:
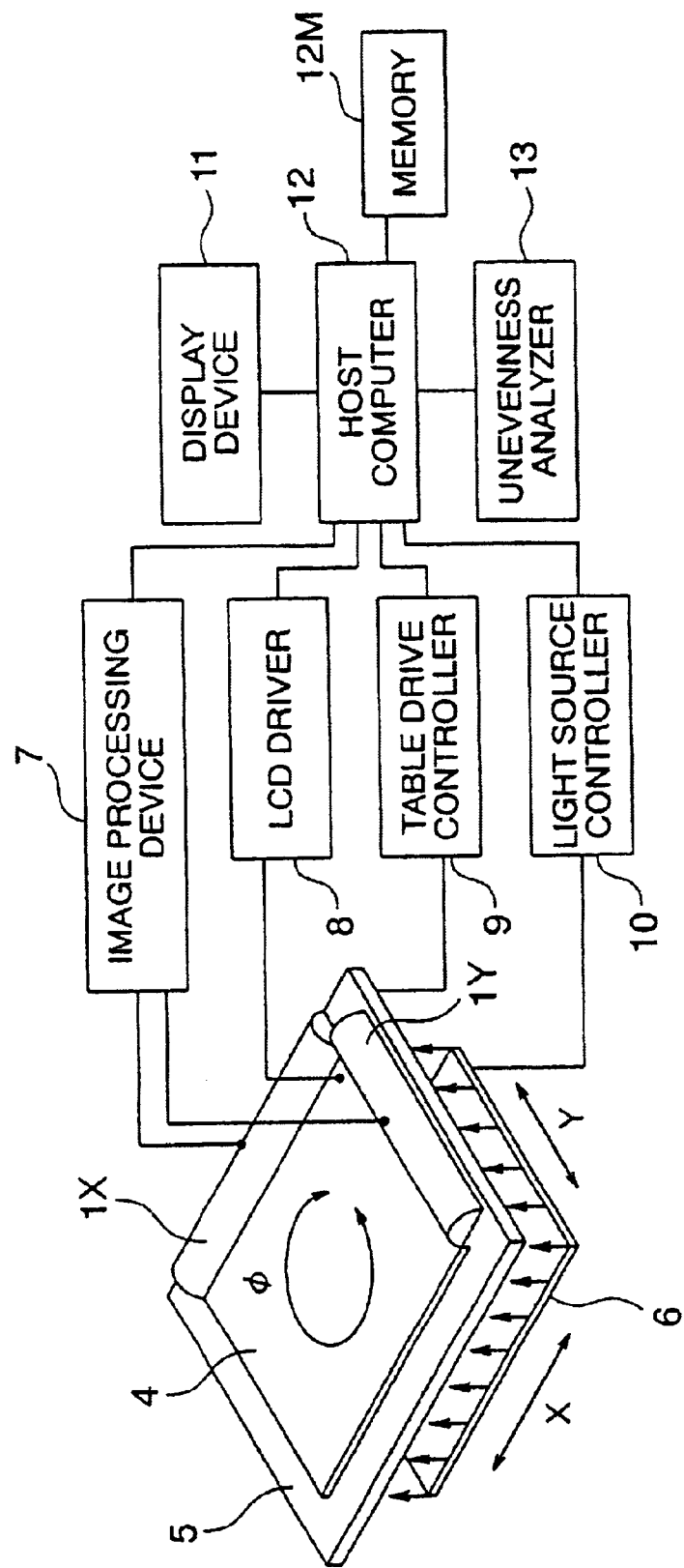
FIG. 5 is a diagram representation of a luminance distribution measurement apparatus utilizing a linear image sensor of the invention.
Figure 6:
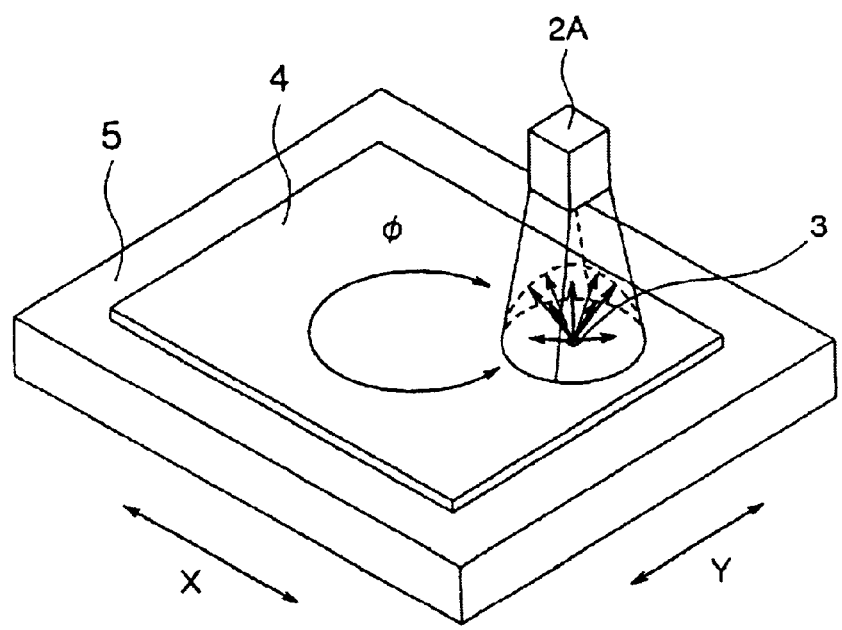
FIG. 6 is a diagram representation of a luminance distribution measurement apparatus utilizing an area image sensor of the invention.
Figure 7:
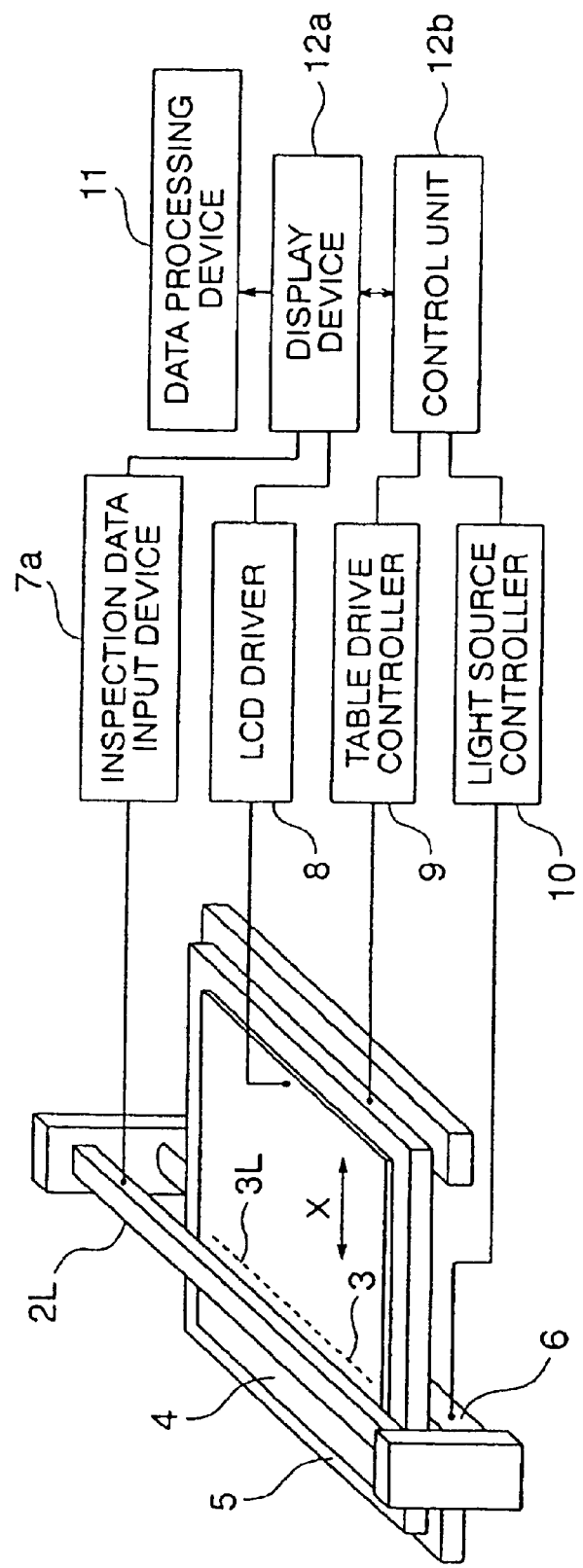
FIG. 7 is a diagram representation of a conventional luminance distribution measurement apparatus.

FIG. 5 shows a luminance measurement apparatus utilizing any one of the sensor heads described in the first through the fourth examples above. The apparatus includes sensor heads 1X and 1Y, which can be any of the sensor heads of EXAMPLE 1 through EXAMPLE 4. Each of the sensor heads 1X and 1Y is arranged on a table 5 such that the sensor head measures radiated light emitted from a pixel line perpendicular to the sensor head at an angle θ in the direction perpendicular to the pixel line. While measuring the light, the axis of the imaginary semi-cylinder is aligned with the pixel line. The apparatus also includes a light source 6, an image processor 7, an LCD driver 8, a table translator control device 9, a light source control device 10, a display device 11, a host computer 12, a memory 12M, and an unevenness analyzer 13. The image processor 7 is implemented for controlling such operations as: sampling light signals by the image sensors; A/D conversion; dark output signal correction; shading correction; filtering; removal of moire patterns of the image sensor signals input; and processing the luminance data obtained.

Using the sensor head 1X, it is possible to quickly obtain viewing angle characteristic data for one or more of the target pixel lines running in the x-direction. The measurable domain of viewing angles is in the range ϕ=90° and θ≦90°, and in the range ϕ=270° and θ≦90° for each pixel 3 in the pixel line (region above the arc 31 shown in FIG. 8). The sensor head 1Y is capable of quickly obtaining viewing angle characteristic data for one or more of the target pixel lines running in the y-direction. The measurable domain of viewing angles are in the range ϕ=0° and θ≦90°, and in the range ϕ=180° and θ≦90° for each pixel 3 in the pixel line (region above the arc 32 shown in FIG. 8).

If a simplified inspection of the LCD panel is sufficient in order to complete the inspection quickly, measurement of viewing angle characteristic by means the sensor heads 1X and 1Y for a collection of pixels in a small region (for example pixels in several pixel lines or multiple point sources) at a time would suffice.

The table 5 has three degrees of freedom of motion in the x-, y-, and ϕ-directions. Thus, by moving the table 5 in the x-, y-, and ϕ-directions relative to the sensor heads 1X and 1Y, it is possible to measure the viewing angle characteristic over the entire pixels on the LCD panel 4. This measurement provides viewing angle characteristic data for the range (1) ϕ=90° and θ≦90°, (2) ϕ=270° and θ≦90°, (3) ϕ=0° and θ≦90°, and (4) ϕ=180° and θ≦90° for each of the pixels on the LCD panel.

Additional viewing angle characteristic data may be obtained for ϕ other than ϕ=0°, 90°, 180°, and 270°, by rotating the table 5 to align it in ϕ-direction. Further, by rotating the table 5 through 90° and by rotating the LCD panel 4 through 90° in ϕ-direction, intensities of radiated light in four directions can be measured by a single sensor head 1, thereby simplifying the measurement apparatus accordingly.

In a case where a luminance distribution is to be measured for a given pixel line running in an arbitrary azimuth direction by bringing the table 5 to ϕ-direction through a rotation, the interval between two adjacent pixels in the target pixel line (referred to as LCD pixel interval) varies with angle ϕ, so that the time interval for sampling two pixels in the linear image sensor must be adjusted in accordance with the LCD pixel interval when scanning the pixel line.

When a monochromatic image sensors are used, luminance data of light radiated from a pixel at (x, y) on the LCD panel in the direction (ϕ, θ) is given by l(x, y, ϕ, θ, K), where K is a parameter called luminance information coefficient.

When color image sensors are used, luminance of light is given as a function in the form l(x, y, ϕ, θ, A, B, C), where A, B, and C are trichromatic information coefficients for red (R), green (G), and blue (B), respectively, obtained by measuring the luminances of R, G, and B pixels independently.

Thus, depending on the image sensors used, the number of linear or area image sensors and sensing parameters thereof may be adjusted in accordance with the azimuth angle of the target pixel line of interest.

The luminance data obtained by the sensor heads is supplied to the host computer 12 and stored in the memory therein. The unevenness analyzer 13 to detects and analyzes unevenness in color and unevenness in contrast of the LCD panel, taking into the color luminance distribution data stored in the memory, and compares the results with reference inspection data for evaluation of the LCD panel. The luminance data and the results of the analysis and of the inspection/evaluation are displayed on the display device 11.

A suitable light source may be chosen for the light source 6, suitable for the object under measurement, work, and items to be inspected. If the pixels are self-luminary owing to the illumination by a back light for example, the LCD panel may be controlled by the LCD driver 8, and the back light may be controlled by the light source control device 9. If the inspection is required for a panel not assembled with the back light, an external light source 6 may be provided to illuminate the panel for the inspection. A planar illuminator, a linear illuminator, or a pin-point illuminator such as a laser can be used as the external light source.

EXAMPLE 8

Figure 8:
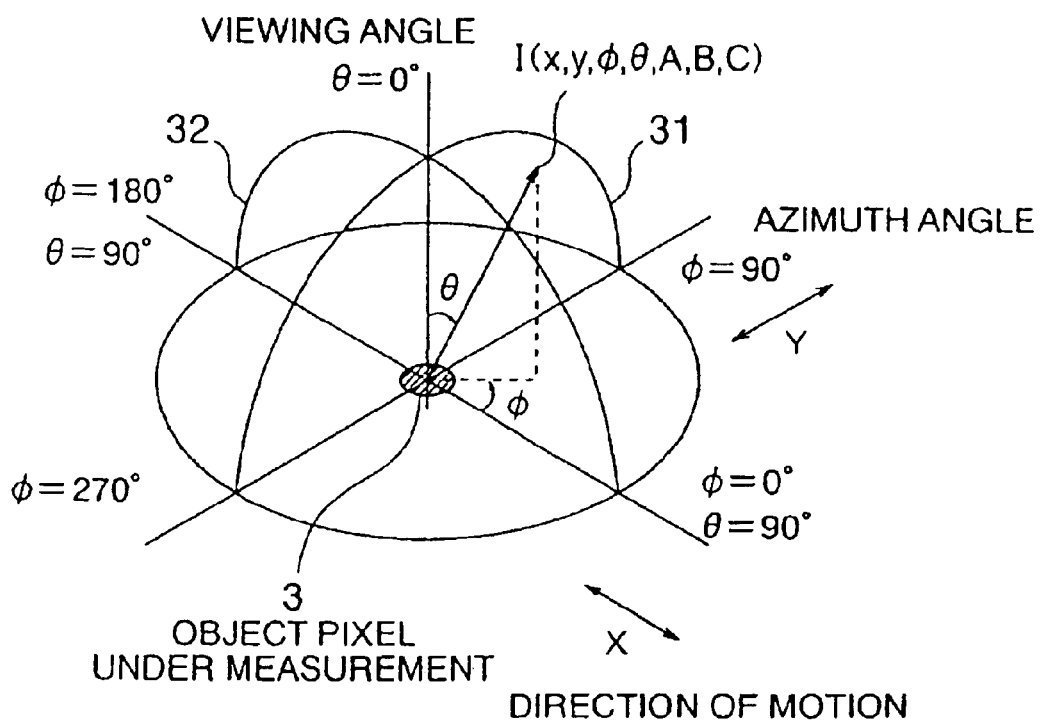
FIG. 8 is a diagram illustrating a polar coordinate system useful in defining spatial distribution of radiation emerging from a pixel or a panel.
Figure 9A:
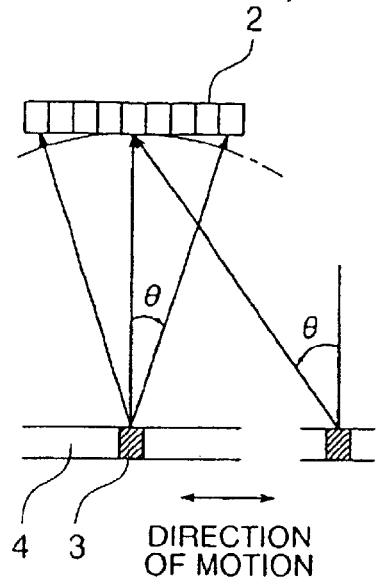
FIGS. 9A, 9B, and 9C show schematically conventional approaches of measuring the luminance distribution of radiation emerging from a light emitting element.
Figure 9B:
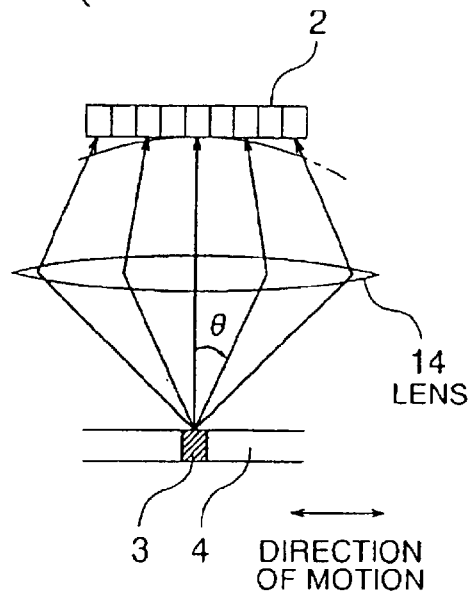
Figure 9C:
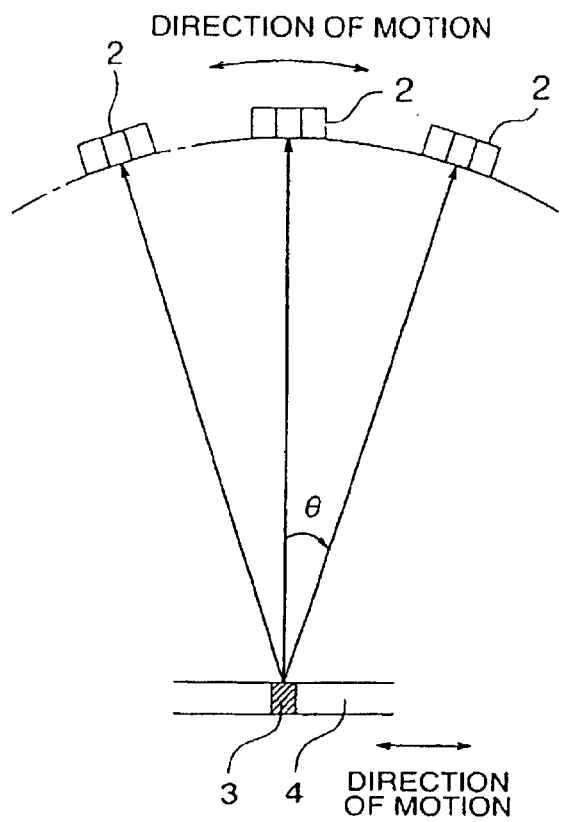

FIG. 8 shows an exemplary luminance distribution measurement apparatus which utilizes a sensor head of EXAMPLE 5 or EXAMPLE 6 so that it is capable of measuring the total luminance of a single pixel or pixels in a small area at a time. The table 5 has three degrees of freedom of motion in the x-, y-, and ϕ-directions.

Thus, in the measurement of the total luminance, the table carrying thereon on the LCD panel 4 is positioned so as to align the sensor head 1 with a pixel (or the pixels in a small area) to be measured by moving the table in the x-, y-, and ϕ directions, and the luminance of the pixel is measured at all viewing angles to obtain luminance data (referred to as all-angle luminance data). The sensor head 1 will be shifted to the next pixel position to obtain all-angle luminance measurement data for the next pixel. By repeating this procedure, all-angle measurement data may be obtained for each pixel.

For detailed angular measurements in the ϕ-direction, the table 5 may be rotated finely in the ϕ-direction.

As described above, the sensor head of the invention can measure viewing angle characteristic of a luminary object in a specific azimuth angle or over all azimuth angles ϕ, for angle of incidence in the range 0°≦θ≦90°. It should be noted that the sensor head can perform measurement for all the angles of incidence between 0° and 90° at a time, it can provide necessary data very quickly.

A luminance distribution measurement apparatus utilizing a sensor head of the invention has a compact form, a simple control mechanism, and high-speed operability for luminance measurement. The luminance inspection/evaluation apparatus of the invention can promptly determine the quality of a product during an inspection/evaluation process, so that the manufacturing cost can be reduced accordingly.

What is claimed is:

1. A sensor head, comprising:
   photosensing means for receiving luminous light from a light source and transforming the light received into an electric signal indicative of the angular distribution of the luminance of the light source,
   wherein said photosensing means comprises a multiplicity of linear image sensors each having a light receiving face and arranged in parallel in the direction of the axis of an imaginary semi-cylindrical surface such that the normal of each light receiving face passes through said axis.

2. A luminance distribution measurement apparatus for measuring the luminance of an object or a line of objects, comprising:
   a sensor head according to claim 1;
   an image processing device for processing the information output from said sensor head;
   a memory for storing the information output from said image processing device;

means for moving said sensor head relative to an object under measurement;

a data processing unit; and a display device, wherein said sensor head is movable to a position where the axis of said imaginary semi-cylinder associated with said sensor head is aligned with said line of objects under measurement.

3. An unevenness inspection/evaluation apparatus for inspecting/evaluating unevenness of displayed image of an object under inspection, comprising:

a luminance distribution measurement apparatus including:

a sensor head according to claim 1;

an image processing device for processing the information output from said sensor head;

a memory for storing the information output from said image processing device;

means for moving said sensor head relative to an object under measurement;

a data processing unit; and a display device, said sensor head movable to a position where the axis of said imaginary semi-cylinder or the center of said imaginary semi-sphere associated with said sensor head coincides with said object under measurement;

an unevenness analyzer for analyzing unevenness of luminance of said object appearing on a display based on the information stored in said memory of said luminance distribution measurement apparatus.

4. A sensor head comprising:

photosensing means for receiving luminous light and transforming the light received into electrical signals that vary in accordance with the brightness of the light; and an optical system having optical paths for receiving, at the light receiving faces thereof, rays of light, emitted from a linear arrangement of light sources, incident vertically upon a predetermined position on a virtual cylindrical surface having a central axis and for transmitting said light received to said photosensing means, said photosensing means including linear image sensors disposed extending in parallel with the central axis of the virtual cylindrical surface for receiving the light transmitted by the optical system.

5. A luminance distribution measurement apparatus for measuring the luminance of an object or a line of objects, comprising:

a sensor bead according to claim 4;

an image processing device for processing the information output from said sensor head;

a memory for storing the information output from said image processing device;

means for moving said sensor head relative to an object under measurement;

a data processing unit; and a display device, wherein said sensor head is movable to a position where the axis of said imaginary semi-cylinder associated with said sensor head is aligned with said line of objects under measurement.

6. An unevenness inspection/evaluation apparatus for inspecting/evaluating unevenness of displayed image of an object under inspection, comprising:

a luminance distribution measurement apparatus including:

a sensor head according to claim 4;

an image processing device for processing the information output from said sensor head;

a memory for storing the information output from said image processing device;

means for moving said sensor head relative to an object under measurement;

a data processing unit; and a display device, said sensor head movable to a position where the axis of said imaginary semi-cylinder or the center of said imaginary semi-sphere associated with said sensor head coincides with said object under measurement;

an unevenness analyzer for analyzing unevenness of luminance of said object appearing on a display based on the information stored in said memory of said luminance distribution measurement apparatus.

* * * * *